(12) United States Patent
Gill et al.

(10) Patent No.: US 9,068,642 B2
(45) Date of Patent: Jun. 30, 2015

(54) SHIFTER ASSEMBLY WITH DECOUPLING MECHANISM

(75) Inventors: Jeremy Gill, Davisburg, MI (US); Sai Her, Detroit, MI (US); Timothy J. Waterman, Grand Haven, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 82 days.

(21) Appl. No.: 13/882,463

(22) PCT Filed: Oct. 31, 2011

(86) PCT No.: PCT/US2011/058588
§ 371 (c)(1),
(2), (4) Date: Jun. 10, 2013

(87) PCT Pub. No.: WO2012/058672
PCT Pub. Date: May 3, 2012

(65) Prior Publication Data
US 2013/0255423 A1    Oct. 3, 2013

Related U.S. Application Data

(60) Provisional application No. 61/408,105, filed on Oct. 29, 2010.

(51) Int. Cl.
*F16H 59/04* (2006.01)
*F16C 1/10* (2006.01)
(Continued)

(52) U.S. Cl.
CPC ....... *F16H 59/0278* (2013.01); *Y10T 74/20049* (2015.01); *F16H 59/10* (2013.01); *G05G 1/04* (2013.01); *F16H 59/0204* (2013.01); *F16H 61/36* (2013.01); *F16H 2059/026* (2013.01)

(58) Field of Classification Search
CPC ....... F16H 9/10; F16H 63/3491; F16H 59/02; F16D 13/08; F16D 41/206; G05G 1/04; G05G 5/22
USPC ................. 74/473.1, 473.12, 473.15, 473.19, 74/473.3; 192/41 S, 219.4, 220.2, 220.3, 192/223.4
See application file for complete search history.

(56) References Cited

U.S. PATENT DOCUMENTS 5,601,162 A * 2/1997 Heimann ...................... 188/170
5,647,465 A * 7/1997 Burkhard et al. .......... 192/220.4
6,732,847 B1 * 5/2004 Wang ......................... 192/220.4
(Continued)

FOREIGN PATENT DOCUMENTS

WO    2004/042256 A1    5/2004
WO    2004/109159 A1    12/2004

*Primary Examiner* — William Kelleher
*Assistant Examiner* — Jake Cook
(74) *Attorney, Agent, or Firm* — Gifford, Krass, Sprinkle, Anderson & Citkowski, P.C.

(57) ABSTRACT

A shifter assembly that includes a base and a shift lever pivotal relative to the base along a straight shift path. A cable mount is linked to the shift lever and a cable is attached to the cable mount. A clutch is linked with the shift lever and cable mount. The clutch selectively transmits motion of the shift lever to the cable mount for a first travel position and decouples the cable mount from the shift lever at a second travel position.

24 Claims, 4 Drawing Sheets

(51) Int. Cl.
*G05G 9/00* (2006.01)
*B60K 6/00* (2006.01)
*B60K 20/00* (2006.01)
*F16H 59/02* (2006.01)
*F16H 59/10* (2006.01)
*G05G 1/04* (2006.01)
*F16H 61/36* (2006.01)

(56) References Cited

U.S. PATENT DOCUMENTS

| | | | |
|---|---|---|---|
| 6,918,314 B2* | 7/2005 | Wang | 74/335 |
| 2001/0004851 A1 | 6/2001 | Kim | |
| 2002/0170376 A1* | 11/2002 | Giefer et al. | 74/532 |
| 2004/0159525 A1* | 8/2004 | Bach et al. | 192/223.4 |
| 2007/0068765 A1* | 3/2007 | Koga | 192/219.4 |

* cited by examiner

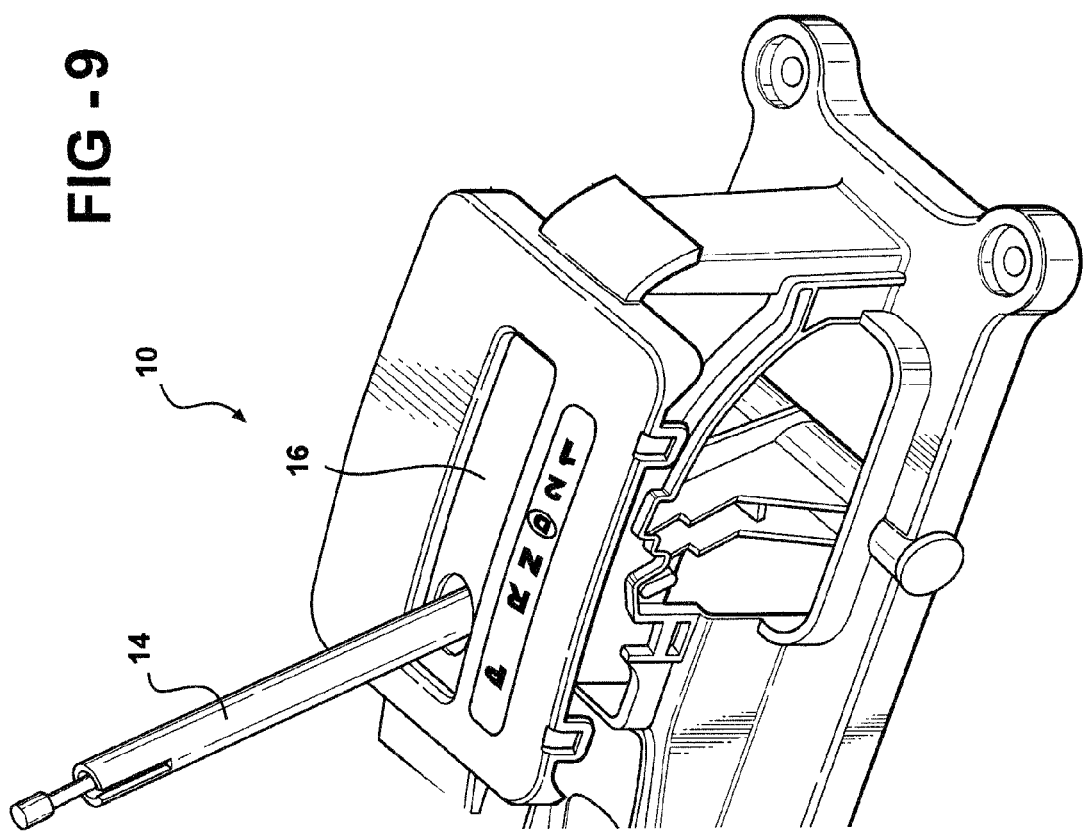

SHIFTER ASSEMBLY WITH DECOUPLING MECHANISM

REFERENCE TO RELATED APPLICATIONS

This application is the U.S. national phase of PCT/US2011/058588 filed Oct. 31, 2011, which claims priority from U.S. Provisional Application Ser. No. 61/408,105 filed Oct. 29, 2010, the content of which is incorporated herein by reference.

FIELD OF THE INVENTION

The invention relates to shifter assemblies and with more particularity to shifter assemblies including a decoupling mechanism.

BACKGROUND OF THE INVENTION

Typically shifter mechanisms are linked with a transmission cable to adjust gears within the transmission as a shifter is moved between various positions. In alternative shifter designs a shifter may be linked to a sensor such that various movements of a shift lever may be detected by an electronic system and change the transmission gear in response to movement of the shift lever. There are also shifters in the art that include a shift gate having a cross body or cross car slot that allows for the shifter to move laterally such that a driver of the vehicle may toggle an automatic transmission in a manual fashion.

However, many vehicles utilize a shift gate that is straight and does not include a lateral or cross car slot allowing a driver to manually adjust a drive gear of the vehicle. There is therefore a need in the art for a shifter assembly that includes a decoupling mechanism that disconnects a shift lever from a transmission cable in a straight gate design. There is also a need in the art for a shifter assembly that includes a clutch that selectively transmits motion of the shift lever to a cable over various travel positions of a shift lever.

Additionally, electronic shifters are also known in the art, however such shifters may need the addition of a cable for various applications when placing a vehicle into a park position. There is therefore a need in the art for a shifter assembly that may accommodate such requirements.

SUMMARY OF THE INVENTION

In one aspect there is disclosed a shifter assembly that includes a base and a shift lever pivotal relative to the base along a straight shift path. A cable mount is linked to the shift lever and a cable is attached to the cable mount. A clutch is linked with the shift lever and cable mount. The clutch selectively transmits motion of the shift lever to the cable mount for a first travel position and decouples the cable mount from the shift lever at a second travel position.

In another aspect there is disclosed a shifter assembly that includes a base and a shift lever pivotal relative to the base. A cable mount is linked to the shift lever. A torsion lock mechanism is linked with the shift lever and cable mount. The torsion lock mechanism selectively transmits motion of the shift lever to the cable mount for a first travel position and decouples the cable mount from the shift lever at a second travel position.

In a further aspect, there is disclosed a shift lever assembly pivotal relative to the base along a straight shift path. The shift path includes a park position and a drive position. A cable mount assembly is linked to the shift lever. The shift lever transmits motion to the cable mount assembly when moving to the park position and decouples from the cable mount when moving along the straight travel path to the drive position.

BRIEF DESCRIPTION OF THE DRAWINGS

FIG. 9 is a partial perspective view of a shifter having a straight shift path.

DETAILED DESCRIPTION OF THE PREFERRED EMBODIMENTS

Figure 2:
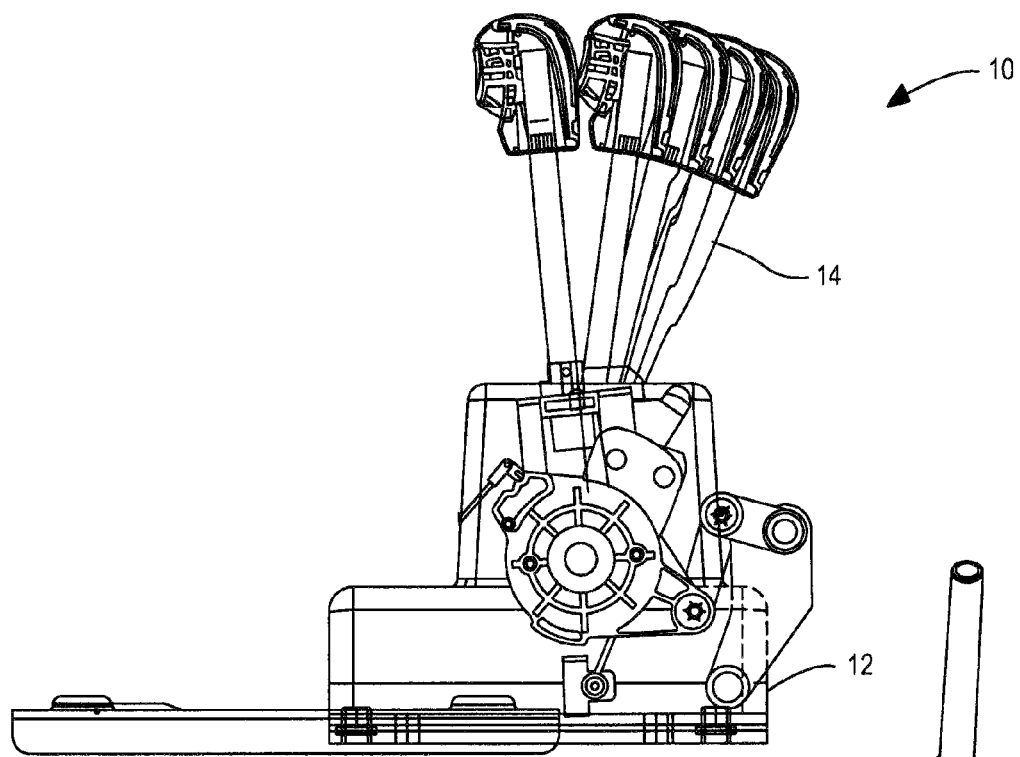
FIG. 2 is a side view of a shifter assembly including a base attached to a vehicle with a shift lever pivotal relative to the base.

Referring to the various figures, there is shown a shifter assembly 10 that includes a base 12 and shift lever or shift lever assembly 14 pivotal relative to the base 12. In one aspect, the shift lever 14 is pivotal relative to the base 12 along a straight shift path 16, as best seen in FIG. 9. A cable mount 18 is linked to the shift lever 14 and a cable 20 is attached to the cable mount 18. A clutch 22 is linked with the shift lever 14 and cable mount 18. The clutch 22 selectively transmits motion of the shift lever 14 to the cable mount 18 for a first travel position and decouples the cable mount 18 from the shift lever 14 at a second travel position. The first and second positions may be set according to various design parameters of the shifter assembly.

Figure 1:
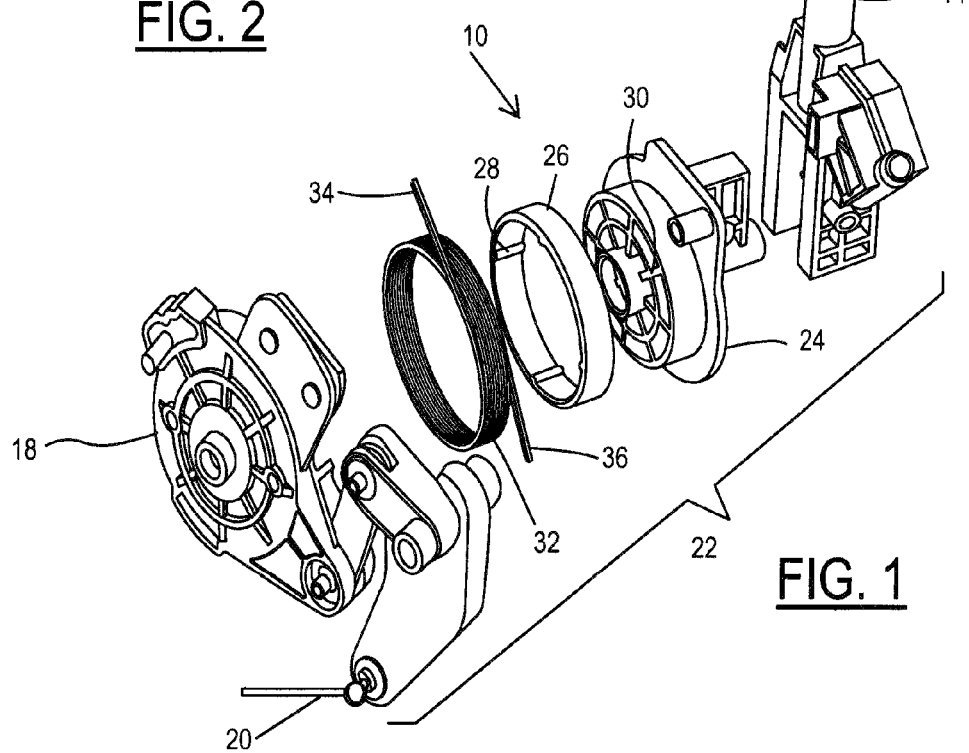
FIG. 1 is a partial exploded view of a shifter assembly including a shift lever, pivot hub, sleeve, spring, and cable mount.

Referring to FIG. 1, there is shown an exploded perspective view of the shifter assembly 10 including a pivot hub 24 attached to the shift lever 14 and disposed within the cable mount 18. A sleeve 26 may be connected about the pivot hub 24. In one aspect, the sleeve 26 may be press fit onto the pivot hub 24. The sleeve 26 may include ribs 28 that are positioned within notches 30 on the pivot hub 24 providing an anti-rotation feature. As described above, the sleeve 26 may be press fit or otherwise attached onto the pivot hub 24. Additionally, the sleeve 26 may be over molded or otherwise formed on the pivot hub 24. In another aspect, the pivot hub 24 may be formed as a part of the shift lever 14.

Again referring to FIG. 1, the shifter assembly 10 may include a spring 32 disposed about the sleeve 26 and positioned within the cable mount 18. The spring 32 may include a first end 34 that is attached to the cable mount 18 and a free end 36 that is not coupled to the cable mount and may extend outside of the cable mount 18. In one aspect, the free end 36 of the spring 32 may engage a kick out structure 38 that is included on the base 12. The kick out structure 38 may be a bracket or other structure attached to the base 12 or may be a molded structure formed with the base 12. Engagement of the free end 36 with the kick out structure 38 will be described in more detail below.

Figure 3:
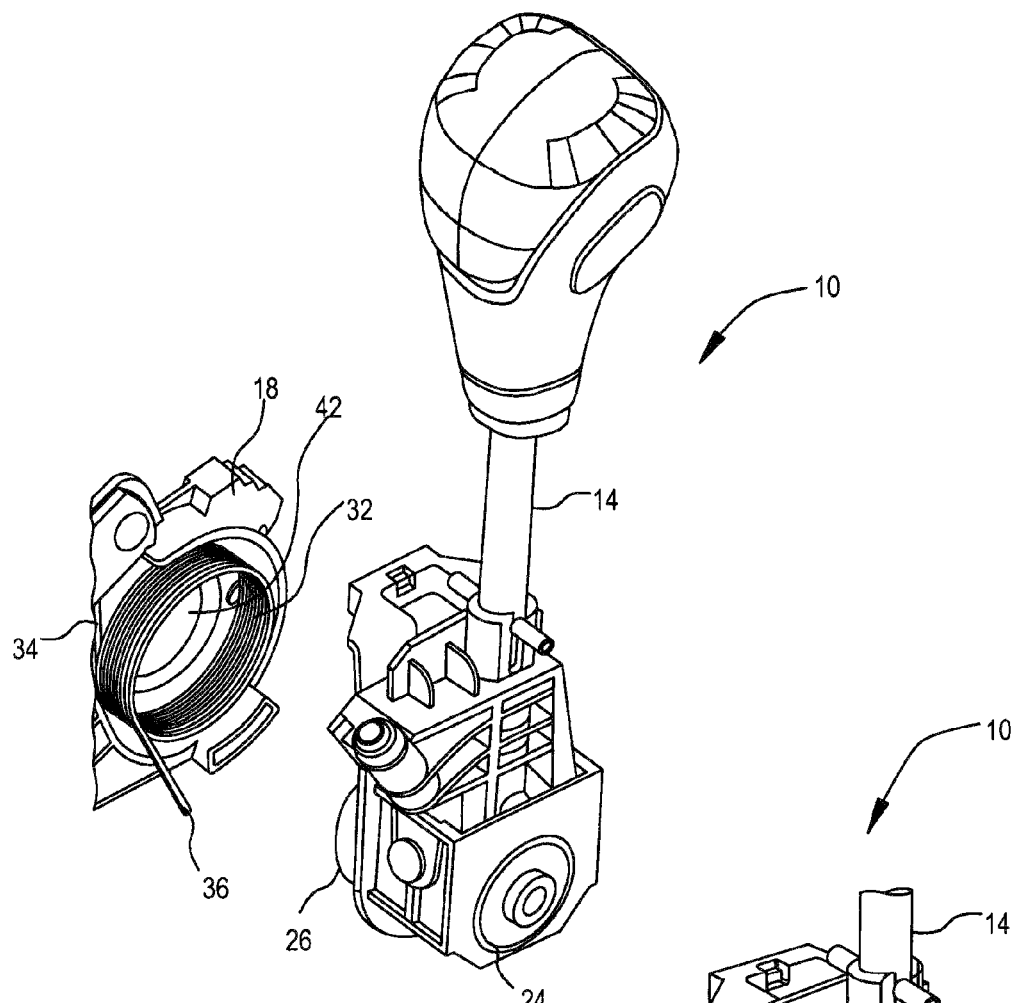
FIG. 3 is a partial exploded perspective view detailing the spring disposed within the cable mount.
Figure 4:
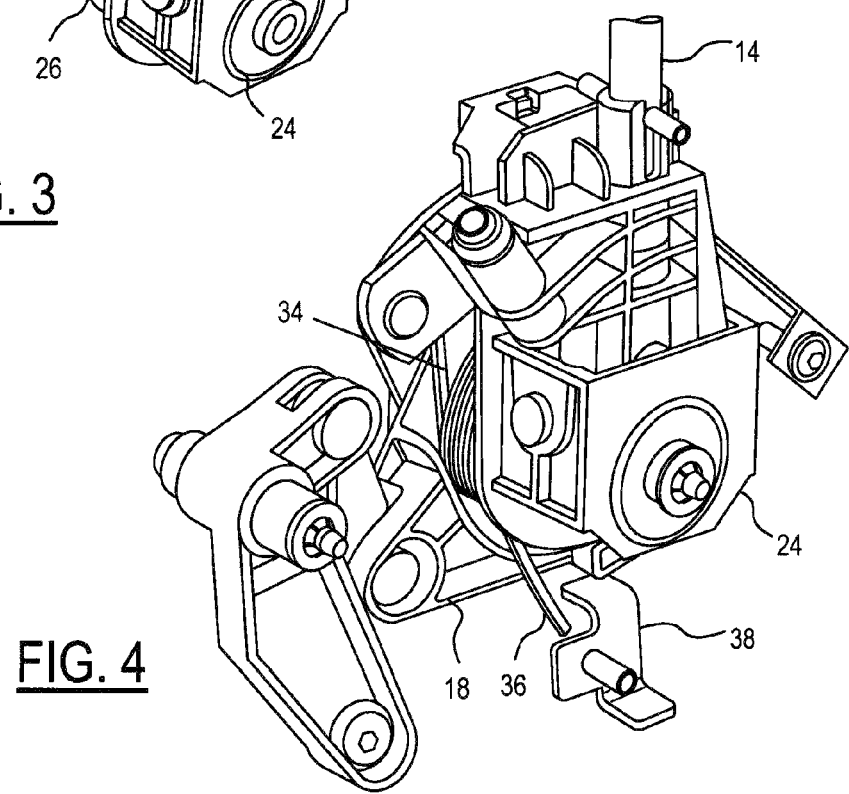
FIG. 4 is a partial perspective view of the shifter assembly with the cable mount and spring coupled to the pivot hub.

As described above, the clutch 22 may be a torsion lock mechanism 40 that is linked with the shift lever 14 and cable mount 18. The torsion lock mechanism 40 selectively transmits motion of the shift lever 14 to the cable mount 18 in the first travel position and decouples the cable mount 18 from the shift lever 14 in the second travel position. As described above, the torsion lock mechanism 40 may include a spring 32 attached at one end 34 to the cable mount 18 and having a free end 36 positioned outside of the cable mount 18. As shown in FIGS. 3 and 4, the spring 32 may be disposed within a cavity 42 formed in the cable mount 18 and is positioned about the sleeve 26 connected to the pivot hub 24. In one aspect, the spring 32 has a frictional fit with the sleeve 26 such that motion of the shift lever 14 is transferred to the cable mount 18 in the first travel position.

In the second travel position the free end 36 of the spring 32 contacts the kick out structure or decoupler 38 and expands the spring 32 out of engagement with the sleeve 26 decoupling the shift lever 14 from the cable mount 18. The position of the decoupling may be set at various travel positions of the shift lever as a design may require.

Figure 8:
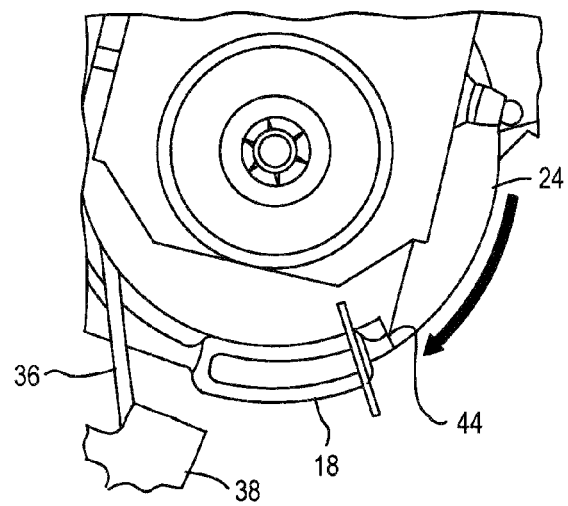
FIG. 8 is a partial perspective view of the cable mount and pivot hub engaging each other transferring motion of the shift lever through the pivot hub into the cable mount when the shift lever is moved from the drive position and returned to a park position.

In one aspect, as best shown in FIG. 8, the pivot hub 24 includes a boss or coupler 44 formed thereon that engages the cable mount 18 and transmits motion from the shift lever 14 to the cable mount 18 when the shift lever 14 is moved from the second travel position to the first travel position.

Figure 5:
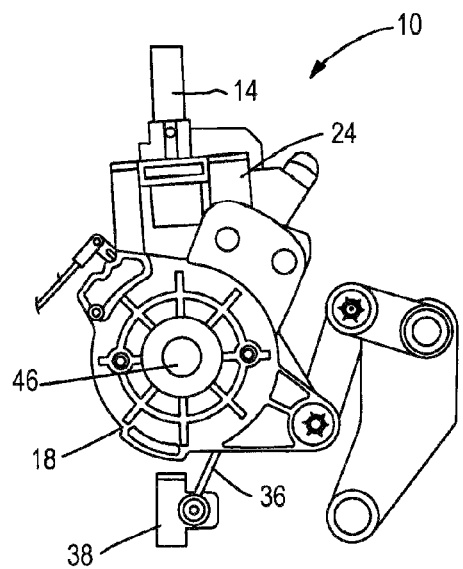
FIG. 5 is a side view of the shifter assembly in a park position.

Referring to FIGS. 5-8, the operation of the shifter assembly 10 will be described as a shift lever 14 pivots about the base 12 along a shift path from park to reverse to drive and back to a park position. Referring to FIG. 5, the shifter assembly 10 is shown in a park position. As can be seen in FIG. 5, a cable 20 is attached to the cable mount 18 which is linked to the shift lever 14 by a clutch 22 or torsion lock mechanism 40. The cable mount 18 is journaled with the pivot hub 24 by a rod or pin 46 that passes through the cable mount 18 and pivot hub 24. The free end 36 of the spring 32 does not contact the kick out structure 38 or decoupler such that pivotal motion of the shift lever 14 is transferred through the pivot hub 24 and spring 32 to the cable mount 18 which in turn applies a rotary or pivoting motion to the cable 20.

Figure 6:
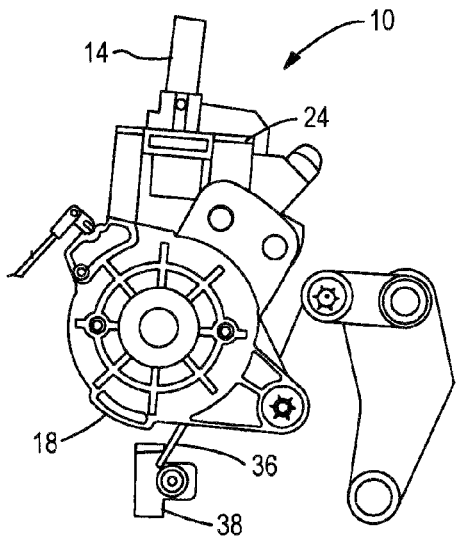
FIG. 6 is a side view of the shifter assembly in a reverse position.

As the shift lever 14 is moved to a reverse position or another position based on alternate designs, as shown in FIG. 6, the free end 36 of the spring 32 contacts the kick out structure 38 such that the spring 32 expands out of engagement with the sleeve 26 decoupling the shift lever 14 from the cable mount 18.

Figure 7:
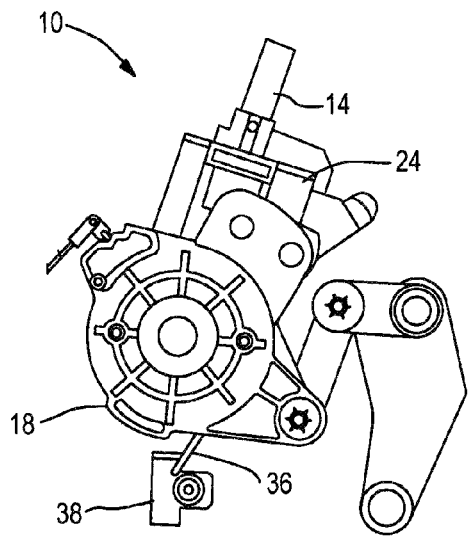
FIG. 7 is a side view of the shifter assembly in a drive position.

Referring to FIG. 7, the shift lever 14 is in a drive position such that movement of the shift lever 14 does not move the cable mount 18 or cable 20 as the spring 32 is expanded out of engagement with the sleeve 26 decoupling the shift lever 14 from the cable mount 18. In this position, the shift lever 14 may be moved between various drive positions such that an electronic sensor or drive-by-wire system can control various drive gears of the transmission without movement of the cable mount 18 and cable 20.

Referring to FIG. 8, there is shown a view of the shifter assembly 10 including the cable mount 18 and pivot hub 24. FIG. 8 details a position of the cable mount 18 and pivot hub 24 as a driver returns the shift lever 14 from a drive position to a park position. As can be seen in the figure, the pivot hub 24 includes a boss 44 or coupler formed thereon that engages the cable mount 18 and transmits motion from the shift lever 14 to the cable mount 18 when the shift lever 14 is moved from the drive position toward the park position. In this manner, lever movements are transferred through the pivot hub 24 into the cable mount 18 which in turn carries the cable mount 18 forward back into a park position. The spring 32 in this position rotates such that the free end 36 is moved out of contact with the kick out structure 38 and frictionally engages the sleeve 26.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A shifter assembly for a vehicle transmission comprising:
   a base;
   a shift lever pivotal relative to the base along a straight shift path;
   a cable mount;
   a transmission shift cable attached to the cable mount;
   a clutch linked with the shift lever and cable mount;
   wherein the clutch selectively couples the shift lever to the cable mount for a first travel position and decouples the cable mount from the shift lever at a second travel position, the clutch including a pivot hub attached to the shift lever and disposed within the cable mount and a spring disposed within the cable mount, the spring selectively transferring motion of the shift lever through the pivot hub.

2. The shifter assembly of claim 1 including a sleeve connected about the pivot hub.

3. The shifter assembly of claim 2 wherein the spring is disposed about the sleeve.

4. The shifter assembly of claim 3 wherein the spring includes a first end attached to the cable mount and a free end.

5. The shifter assembly of claim 4 wherein the base includes a kick out structure.

6. The shifter assembly of claim 3 wherein the spring engages the sleeve connected about the travel hub and transmits motion of the shift lever to the cable mount in the first travel position.

7. The shifter assembly of claim 5 wherein the free end of the spring contacts the kick out structure at the second travel position expanding the spring out of engagement with the sleeve decoupling the shift lever from the cable mount.

8. The shifter assembly of claim 2 wherein the pivot hub includes a boss formed thereon wherein the boss engages the cable mount and transmits motion from the shift lever to the cable mount when the shift lever is moved from the second travel position to the first travel position.

9. A shifter assembly comprising:
   a base;
   a shift lever pivotal relative to the base;
   a cable mount;
   a torsion lock mechanism linked with the shift lever and cable mount;
   wherein the torsion lock mechanism selectively transmits motion of the shift lever to the cable mount for a first travel position and decouples the cable mount from the shift lever at a second travel position the torsion lock including a spring disposed within the cable mount, the spring selectively transferring motion of the shift lever to the cable mount.

10. The shifter assembly of claim 9 including a pivot hub attached to the shift lever and disposed within the cable mount.

11. The shifter assembly of claim 9 wherein the torsion lock mechanism includes a sleeve connected about the pivot hub and the spring is disposed about the sleeve.

12. The shifter assembly of claim 11 wherein the spring includes a first end attached to the cable mount and a free end.

13. The shifter assembly of claim 12 wherein the base includes a kick out structure.

14. The shifter assembly of claim 11 wherein the spring engages the sleeve connected about the travel hub and transmits motion of the shift lever to the cable mount in the first travel position.

15. The shifter assembly of claim 13 wherein the free end of the spring contacts the kick out structure at the second travel position expanding the spring out of engagement with the sleeve decoupling the shift lever from the cable mount.

16. The shifter assembly of claim 10 wherein the pivot hub includes a boss formed thereon wherein the boss engages the cable mount and transmits motion from the shift lever to the cable mount when the shift lever is moved from the second travel position to the first travel position.

17. A straight gate shifter assembly comprising:
a base;
a shift lever assembly pivotal relative to the base along a straight shift path, the shift path including at least a park position and a drive position;
a cable mount assembly linked to the shift lever;
wherein the shift lever transmits motion to the cable mount assembly when moving to the park position and decouples from the cable mount when moving along the straight travel path to the drive position and a spring disposed within the cable mount, the spring selectively transferring motion of the shift lever to the cable mount.

18. The shifter assembly of claim 17 wherein the shift lever is frictionally locked by the spring to the cable mount when moving to the park position.

19. The shifter assembly of claim 17 wherein the shift lever assembly includes a pivot hub that intermittently frictionally engages the cable mount assembly through frictional engagement of the pivot hub and the spring.

20. The shifter assembly of claim 19 including a sleeve connected about the pivot hub.

21. The shifter assembly of claim 20 wherein the spring is disposed about the sleeve and positioned within the cable mount.

22. The shifter assembly of claim 21 including a decoupler and coupler separate from the decoupler.

23. The shifter assembly of claim 22 wherein coupler actuates the spring to reconnect the shift assembly to the cable mount assembly.

24. The shifter assembly of claim 22 wherein the decoupler actuates the spring expanding the spring out of engagement with the sleeve decoupling the shift lever from the cable mount.

* * * * *